United States Patent
Dohrer et al.

(10) Patent No.: US 6,359,050 B1
(45) Date of Patent: Mar. 19, 2002

(54) POLYETHYLENE COMPOSITIONS AND FILMS FORMED THEREFROM HAVING IMPROVED MOISTURE VAPOR TRANSMISSION RATES

(75) Inventors: Kathryn Kobes Dohrer, Longview, TX (US); Wesley Raymond Hale, Kingsport, TN (US); Irving Daniel Sand, Loveland, OH (US); Mark Alan Edmund, Longview, TX (US); Martin Ray Tant, Kingsport, TN (US); Emmett Dudley Crawford, Kingsport, TN (US); Edward Philip Savitski, Kingsport, TN (US); Dennis Brannon Barr, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/627,501

(22) Filed: Jul. 28, 2000

(51) Int. Cl.⁷ .............................. C08K 3/26; C08L 23/08
(52) U.S. Cl. .................. 524/425; 526/348.1; 526/348.2
(58) Field of Search ................................ 524/425, 502; 526/348.1

(56) References Cited

U.S. PATENT DOCUMENTS

| | | | |
|---|---|---|---|
| 4,116,892 | A | 9/1978 | Schwarz |
| 4,427,614 | A | 1/1984 | Barham et al. |
| 4,626,252 | A | 12/1986 | Nishizawa et al. |
| 4,880,592 | A | 11/1989 | Martini et al. |
| 5,073,316 | A | 12/1991 | Bizen et al. |
| 5,972,444 | A | * 10/1999 | Patel et al. |
| 5,998,505 | A | 12/1999 | Brink |

FOREIGN PATENT DOCUMENTS

| | | |
|---|---|---|
| JP | 56-62117 A | 4/1984 |
| WO | WO 98/05501 A1 | 2/1998 |
| WO | WO 00/23255 A1 | 4/2000 |

* cited by examiner

*Primary Examiner*—Tae H. Yoon
(74) *Attorney, Agent, or Firm*—Bernard J. Graves, Jr.; Jonathan D. Wood

(57) ABSTRACT

A novel composition is provided comprising a specified polyethylene component and a filler such that a film formed from the composition is characterized by having increased moisture vapor transmission rate.

8 Claims, No Drawings

POLYETHYLENE COMPOSITIONS AND FILMS FORMED THEREFROM HAVING IMPROVED MOISTURE VAPOR TRANSMISSION RATES

FIELD OF THE INVENTION

This invention relates to polyethylene compositions that are new and useful, and films produced therefrom that are characterized by preferably having increased moisture vapor transmission rates (MVTR).

BACKGROUND OF THE INVENTION

It is known that properly formulated films fabricated from polyethylene that have been filled with solid particles (e.g., a mineral such as calcium carbonate) can be stretched under appropriate conditions creating a porous structure that allows for the diffusion of water vapor while providing a liquid barrier. This is a desirable property in markets such as hygienics, industrial and medical. Indeed, a major consideration in the comfort of a garment is its ability to maintain a balance between heat production and heat loss. The loss of heat through clothing may occur through direct dry heat loss or by moisture evaporation. In respect to the latter, the moisture vapor transmission rate of the material utilized in forming the garment is generally related to the breathability of the material. Breathability is the ability to diffuse moisture/water vapor through a film or garment. In addition to this property, there are many applications requiring that the material used in preparing the garment be impermeable to a liquid. Such applications include diaper back sheets, sanitary napkins, medical protective garments, surgical incise drapes, transdermal patches, wound care bandages and dressings, intravenous site dressings, ostomy site dressings, breathable housewrap, among others.

Films which are permeable to water vapor and are porous but yet are intended to be impermeable to a liquid are described in U.S. Pat. Nos. 4,626,252 and 5,073,316. As disclosed, a porous film is obtained by mixing a polyolefin resin, an inorganic filler and a plasticizer; forming a film from the mixture; and uniaxially or biaxially stretching the film. Films of this type are also disclosed in U.S. Pat. No. 5,998,505 and PCT International Application Publication No. WO 98/05501.

SUMMARY OF THE INVENTION

It is accordingly an object of the present invention to provide new and improved polyethylene compositions or blends.

It is a further object of this invention to provide novel polyethylene compositions or blends of specific polyethylenes and fillers.

It is a further object of this invention to provide novel films produced from the novel compositions, which films are characterized by having improved moisture vapor transmission rates (MVTR).

These and other objects and advantages of the present invention will be apparent to those skilled in the art from the following detailed description and claims.

In accordance with the present invention, it has been found that the above and still further objects are achieved by combining at least one or more specific polyethylenes and a filler to provide a new and novel composition that is suitable to provide films that are characterized by having improved moisture vapor transmission rates (MVTR). The compositions and films are useful in many applications.

More particularly, in accordance with the present invention, a polyethylene composition is provided comprising (a) an ethylene homopolymer or ethylene interpolymer having a density of from about 0.91 to about 0.93 g/cc (grams/cubic centimeter), a melt index (M.I.) of from about 1 to about 5 grams per 10 minutes (g/10 min), a weight percent high temperature fraction (% HT) as determined by TREF of about 25 to about 50 weight %, and a number average molecular weight (Mn) of the HT fraction collected during TREF procedure of from about 35,000 to about 52,000 g/mol, with the % HT preferably ranging from about 30 to about 45%; preferably the ethylene homopolymer or interpolymer component is present in the composition in an amount of from about 20 to about 80 weight percent (%); and (b) a filler present in an effective amount, such that a film formed from the novel polyethylene composition has increased MVTR; preferably the filler is present in the composition in an amount of from about 20 to about 80 weight percent.

In addition to the novel compositions, the present invention is also directed to films formed from the novel compositions that are characterized by having increased moisture vapor transmission rates.

Additionally, the present invention is directed to articles of manufacture incorporating the novel compositions and novel films, of the present invention. Such articles include garments, diapers, sanitary napkins, medical protective garments, surgical incise drapes, transdermal patches, wound care bandages and dressings, intravenous site dressings, and ostomy site dressings, and others, incorporating the novel thermoplastic compositions and films of the present invention.

DETAILED DESCRIPTION OF THE INVENTION

The compositions of the present invention comprise (a) at least one, or more, of an ethylene homopolymer or ethylene interpolymer having a density of from about 0.91 to about 0.93 g/cc (gram/cubic centimeter), a melt index (M.I.) of from about 1 to about 5 grams per 10 minutes (g/10 min), a weight percent high temperature fraction (% HT) as determined by TREF of about 25 to about 50 weight %, and a number average molecular weight (Mn) of the HT fraction collected during TREF procedure of from about 35,000 to about 52,000 g/mol, with the % HT preferably ranging from about 30 to about 45%; preferably the ethylene homopolymer or interpolymer component is present in the composition in an amount of from about 20 to about 80 weight percent (%); and (b) a filler present in an effective amount, such that a film formed from the novel polyethylene composition has increased MVTR; preferably the filler is present in the composition in an amount of from about 20 to about 80 weight percent.

The ethylene component of the present composition is a homopolymer of ethylene or an interpolymer of ethylene and at least one or more other olefin(s). Preferably, the olefins are alpha-olefins. The olefins may contain from about 2 to about 16 carbon atoms. The interpolymer of ethylene and at least one other olefin comprise an ethylene content of at least about 50% by weight of the total monomers involved. Exemplary olefins that may be utilized herein are propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene.

The ethylene homopolymer or interpolymer of the present composition may be prepared by any manner known to those skilled in the art. In the present instance, the ethylene homopolymers and interpolymers were prepared using the following procedure.

The polymerization process utilized herein was carried out in a fluidized-bed reactor for gas-phase polymerization, consisting of a vertical cylinder of diameter 0.74 meters and height 7 meters and surmounted by a velocity reduction chamber. The reactor is provided in its lower part with a fluidization grid and with an external line for recycling gas, which connects the top of the velocity reduction chamber to the lower part of the reactor, at a point below the fluidization grid. The recycling line is equipped with a compressor for circulating gas and a heat transfer means such as a heat exchanger. In particular the lines for supplying ethylene, an olefin such as 1-butene, 1-pentene and 1-hexene, hydrogen and nitrogen, which represent the main constituents of the gaseous reaction mixture passing through the fluidized bed, feed into the recycling line. Above the fluidization grid, the reactor contains a fluidized bed consisting of a polyethylene powder made up of particles with a weight-average diameter of about 0.5 mm to about 1.4 mm. The gaseous reaction mixture, which contains ethylene, olefin comonomer, hydrogen, nitrogen and minor amounts of other components, passes through the fluidized bed under a pressure ranging from about 280 psig to about 300 psig with an ascending fluidization speed, referred to herein as fluidization velocity, ranging from about 1.6 feet per second to about 2.0 feet per second. The reactor temperature generally ranges from about 30 to about 110° C.

The Ziegler-Natta catalyst used was obtained from Grace Davison, Baltimore, Maryland, under the product name XPO-5021. The catalyst was a titanium-based catalyst supported on silica. The catalyst was introduced directly into the reactor without having been formed into a prepolymer. The rate of introduction of the catalyst into the reactor was adjusted in achieving the desired production rate. During the polymerization the co-catalyst was introduced continuously into the line for recycling the gaseous reaction mixture, at a point situated downstream of the heat transfer means. The feed rate of co-catalyst is expressed as a molar ratio of trialkylalumunium to titanium (Al/Ti), and is defined as the ratio of the co-catalyst feed rate (in moles of trialkylaluminum per hour) to the catalyst or prepolymer feed rate (in moles of titanium per hour). Tetrahydrofuran (THF) was introduced continuously into the line for recycling the gaseous reaction mixture as a solution in either n-hexane or 1-hexene at a concentration of about 1 weight percent. The feed rate of THF is expressed as a molar ratio of THF to titanium (THF/Ti), and is defined as the ratio of the THF feed rate (in moles of THF per hour) to the catalyst feed rate (in moles of titanium per hour).

In the preparation of the exemplary ethylene-1-hexene interpolymer herein, the following specific operating conditions were utilized in the process set forth hereinabove. The reactor pressure was 296 psig; the reactor temperature was 84° C.; the fluidization velocity was 1.9 feet/second; the fluidization bulk density was 14.6; the reactor bed height was 11.5 feet; the ethylene content was 40 mole %; the molar ratio of $H_2/C_2$ was 0.421; the molar ratio of 1-hexene/$C_2$ was 0.105; the molar ratio of TEAL (triethyluminum)/Ti (titanium) was 30.5; the molar ratio of THF/Ti was 5.8; the rate of addition of catalyst was 0.01 pounds/hour; the production rate was 186 pounds/hour; the residence time was 4.2 hours; and the residual titanium was 0.4 ppm. The resulting ethylene-1-hexene interpolymer was characterized as having a density of 0.916 g/cc, a melt index of 2.6 g/10 min, a weight % HT of about 39.2%, and a Mn of about 45,000 g/mol.

The filler useful in preparing the novel compositions of this invention include any filler material that will result in a composition from which a film that is produced is characterized by having an increased MVTR. The amount of filler utilized is any amount that is effective or sufficient to provide a composition from which there can be produced films having the increased MVTR. Preferably, the filler will be present in the composition in an amount of from about 20 to about 80% by weight, based on the total composition.

Exemplary fillers that are suitable for use herein are inorganic fillers such as calcium carbonate, talc, clay, kaolin, silica, diatomaceous earth, magnesium carbonate, barium carbonate, magnesium sulfate, barium sulfate, calcium sulfate, aluminum hydroxide, zinc oxide, magnesium oxide, titanium oxide, aluminum oxide, mica, glass powder, zeolite, silica clay, and the like. Preferred for use herein is a calcium carbonate, that may optionally be coated with a fatty acid. A typical calcium carbonate is that supplied by English China Clay under the registered trademark SUPERCOAT calcium carbonate, reported as being 97.6% calcium carbonate (prior to surface treatment) with a mean particle size of 1 micron (top cut of 10 microns) and surface area of 7.2 $m^2/g$ (determined by BET).

For many purposes, it may be desirable to incorporate other conventional additives with the polyethylene compositions of the present invention. For example, there may be added antioxidants, heat and light stabilizers, dyes, antistatic agents, lubricants, preservatives, processing aids, slip agents, antiblocking agents, pigments, flame retardants, blowing agents, and the like. More than one additive may be used. The additive may be present in any desired amount. Accordingly, the amount of additive utilized will depend upon the particular polyethylene and filler used and the application or usage intended for the composition and film. Compositions containing such other additives are within the scope of this invention. It is within the skill of the ordinary artisan in possession of the present disclosure to select the appropriate additive(s) and amount thereof depending on the processing conditions and end use of the composition.

The novel polyethylene compositions comprising the specified polyethylene component and the filler can be readily prepared utilizing any conventional method, and the novel films can be formed from the resultant polyethylene compositions utilizing any means known in the art. For example, polyethylene compositions can be prepared in an apparatus such as a torque rheometer, a single screw extruder or a twin screw extruder. Formation of films from the resulting compositions can be achieved by melt extrusion, as described, for example, in U.S. Pat. No. 4,880,592, or by compression molding as described, for example, in U.S. Pat. No. 4,427,614, or by any other suitable method.

In preparing the compositions of the examples herein, the polyethylene component and the filler were compounded in a Kobelco continuous mixer model NEX-T60. The mixer was operated at 400° F., a mixing speed of 800 rpm, and a production rate of 200 lbs/hour. The polyethylene component and the filler were fed to the mixer to produce a polyethylene filler composition containing 50 wt % filler. Additionally, 100 ppm Dynamar FX 9613 processing aid (supplied by Dyneon, Oakdale, Minn.) and 150 ppm Irganox B215 antioxidant (supplied by Ciba Specialty Chemicals Corporation, Terrytown, N.Y.) were added to the polyethylene filler composition during mixing. The filler utilized was SUPERCOAT calcium carbonate, described herein.

In addition to the novel compositions, the present invention is also directed to films formed from the novel compositions that are characterized by having increased moisture vapor transmission rates. Furthermore, the physical properties of the films are not detrimentally affected as a result of incorporating the filler.

The polyethylene compositions of the present invention may be fabricated into films by any technique known in the art. For example, films may be produced by the well known cast film, blown film and extrusion coating techniques, the latter including extrusion onto a substrate. Such a substrate may also include a tie-layer. Preferred substrates include woven and nonwoven fabrics. Films produced by melt casting or blowing can be thermally bonded or sealed to a substrate using an adhesive. The ordinary artisan, in possession of the present disclosure, can prepare such films and articles containing such films without undue experimentation.

As shown hereinafter in the examples, blown film is produced from the polyethylene compositions of the present invention by introducing the composition into the feed hopper of a 2.5 inch Egan extruder with a 24/1 Length/Diameter. The film was produced using a circular 6 inch Sano die having a gap of 0.088 inch (88 mils) and dual air lips. The extrusion conditions used to process the filled polyethylene compositions (referred to as resins) were as follows:

| Barrel Temperatures | | |
| --- | --- | --- |
| Zone 1 | ° F. | 380 |
| Zone 2 | ° F. | 450 |
| Zone 3 | ° F. | 430 |
| Zone 4 | ° F. | 420 |
| Zone 5 | ° F. | 400 |
| Die Temperatures | | |
| Zone 1 | ° F. | 425 |
| Zone 2 | ° F. | 425 |
| Zone 3 | ° F. | 425 |
| Zone 4 | ° F. | 425 |

In processing the filled polyethylene compositions, the parameters held constant were output rate (89 lb/hr=4.7 lb/hr-in die circumference) and blow-up ratio of 2.4:1. The films were to be stretched via the interdigitation method and accordingly were fabricated at a thickness of 1.3±0.1 mil.

Interdigitation is a stretching process that is well known in the art whereby the filled film, while under tension, is passed between intermeshing, grooved cylinders or intermeshing disks. Machine direction stretching is accomplished by passing the film through a gear-like intermeshing cylinder pair and transverse stretching is accomplished by passing the film through a disk-like roller pair. Each point of contact with the grooves or disks applies localized stress to the film. It is at these points that the film stretches. The resulting stretched film consists of narrow, parallel bands where stretching has occurred separated by bands of unstretched film. The amount of stretching is governed by the amount of interengagement between the grooved cylinder pair or the intermeshing disk pair. Pores in films stretched by this process are found in the stretched bands. When films are stretched biaxially by the interdigitation process, a crosshatched pattern of stretched bands is produced. The examples shown here of films stretched biaxially at room temperature by the interdigitation method were prepared at Biax FiberFilm Corporation, Greenville, Wis. Further information on the interdigitation method may be found in U.S. Pat. No. 4,116,892 and PCT WO 00/23255. The stretch ratio was held constant at a 1.1× machine direction stretch followed by a 1.125× transverse direction stretch. The stretch ratio is determined by drawing a 1 inch diameter circle on the film and then passing this film through the intermeshing grooved cylinder pair or intermeshing disk pair. The circle diameter is then again measured, in the direction, yielding the stretch ratio.

Additionally, the present invention is directed to articles of manufacture incorporating the novel compositions and novel films, of the present invention. Such articles include, but are not limited to, garments, diapers, sanitary napkins, medical protective garments, surgical incise drapes, transdermal patches, wound care bandages and dressings, intravenous site dressings, and ostomy site dressings, and others. The articles can be produced utilizing any suitable technique.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES

In the following examples the test procedures listed below were used in evaluating the analytical properties of the polyethylene component, and the physical properties of the films produced from the compositions of the polyethylene component and filler.

(a) Density—ASTM D4883; units are g/cc (grams/cubic centimeter); plaques are prepared according to ASTM D1928, Procedure C.

(b) Melt Index—ASTM D1238 (Condition 190/2.6); units are g/10 min (grams/10 minutes).

(c) Dart Impact—ASTM D1709A; units are g (grams).

(d) Tensile—ASTM D882; units are g (grams).

(e) Moisture Vapor Transmission Rate (MVTR) is measured according to ASTM Test Method E96. The apparatus for this experiment consists of a test dish, environmental Thermotron test chamber, and a balance. The test dish is noncorroding and is impermeable to liquid water and water vapor. The mouth area of the dish defines the test area such that the overlay material is masked to eliminate this potential source of error. The water level is filled to ¾ inch below the mouth to avoid contact of water with the specimen and covers the dish bottom throughout the entire experiment. The Thermotron test chamber Model SM5.5S controls the temperature and relative humidity. The temperature for this work was selected at 90° F. (32° C.) which is the standard test condition designated as ASTM E-96D. The relative humidity is maintained at 50±2%. Air is continuously circulated over the face of the film at a rate of 200 m/s (meters per second). The Mettler P1200 balance detects changes in weight smaller than 1% (0.01 grams) of the weight change during the steady state period. Samples are secured on the test dish and weighed. The samples are then placed into the test chamber for two hours and then weighed again. The samples are put back into the oven for a total of 24 hours and the weights are measured twice more over the 24 hour period. The MVTR of each sample is calculated by the following equation:

MVTR=(g)/(A)(T)

Where g=weight change during test (grams)

A=test area (m$^2$)

T=time=1 day

The weight loss data is plotted and the slope of the straight line is the rate of the water vapor transmission through the film. The slope of the line is then divided by the area of the sample tested to obtain a normalized MVTR.

(f) Temperature Rising Elution Fractionation (TREF) experiments were performed with a Polymics CAP-TREF system (Polymics, State College, Pa.). Two TREF experiments were required to complete the analyses. The first one uses the analytical TREF profile to generate the weight percent of the high temperature (HT) fraction. The second one uses the fraction collection TREF profile for acquisition of the HT fraction.

Sample polymer solutions for TREF were prepared by dissolving the polyethylene into the solvent 1,2,4-trichlorobenzene (TCB) at a level of approximately 0.15 g polyethylene in 15 mL TCB in glass vials. The TCB used for the TREF and gel permeation chromatography (GPC) contained approximately 2 g of 2,6-di-tert-butyl-4-methylphenol (BHT) per 4000 mL TCB as an antioxidant. The polyethylene was dissolved into the TCB by heating the samples for 4 hours at 160° C. in a Reacti-Therm III heating/stirring block (Pierce, Rockford, Ill.).

The crystallization support, CHROMOSORB P (Sigma, St. Louis, Mo.), is a 45–60 mesh acid washing diatomite. The CHROMOSORB P support was also heated to 160° C. and approximately 8 grams of the hot CHROMOSORB P support was added to the polymer solutions after all of the polyethylene was completely dissolved into the TCB. These 160° C. samples containing the polyethylene, TCB, and CHROMOSORB P support were then capped and the vials were then transferred to the crystallization oven (Despatch LAC, Despatch Industries, Minneapolis, Minn.) that had been pre-warmed to 150° C. The crystallization oven was then programmed to equilibrate the samples at 150° C. for 2 hours before cooling the samples at a rate of 2° C./hour to a temperature of 30° C. Chilled water was piped into a heat exchanger at a flow rate low enough to not disrupt the oven high temperature yet permit complete cooling to 30° C.

The polymer and TCB containing CHROMOSORB P support were then packed into analytical TREF cartridges and run in the Polymics CAP TREF using an analytical TREF profile. The analytical profile maintained the samples at 25° C. for 5 minutes and a flow rate of 10 ml/min before heating to 135° C. at a heating rate of 200° C./hour and a flow rate of 20 ml/min. The eluent was the TCB described above. The weight percent of the high temperature fractions (% HT) was defined as the proportion of material eluting above 90° C. as determined from the cumulative weight fraction curves of the analytical TREF experiments. The results of TREF are reported as wt % HT.

A second analytical TREF experiment was needed for the collection of the high temperature fraction of the polyethylene. The sample preparation was identical to the method described above. The fraction collection profile was similar to the analytical profile described above except that when the column temperature reaches 90° C. it is programmed to isotherm at that temperature for 10 minutes. After the 90° C. isotherm the solvent outlet line is moved to a beaker to collect the material that melts above 90° C. while the program proceeds by ramping the temperature to 135° C. at a heating rate of 200° C./hour and a flow rate of 20 ml/min.

The HT fraction was collected over the temperature range of 90 to 120° C. based on the analytical TREF elution curve of National Institute of Standards and Technology linear polyethylene standard SRM 1475 (U.S. Department of Commerce, Gaithersburg, Md.). This amounted to roughly 180 mL of solution. An approximately equivalent volume of acetone was added to the effluent while stirring. The mixtures were then allowed to cool to room temperature and the precipitated polymer was then filtered off using a vacuum filtration system with a 0.45 μm ZEFLUOR PTFE membrane filter (Pall Gelman Sciences, Ann Arbor, Mich.). The collected polymer was washed with excess acetone and was then collected by scraping it off the filter using a razor blade.

(g) Number Average Molecular Weight (Mn)—GPC analyses to determine number average molecular weight (Mn) were performed on the isolated HT polyethylene fractions collected during the TREF analysis using a Polymer Labs GPC 210 system (Polymer Laboratories, Amherst, Mass.) using TCB as the solvent. The GPC samples were prepared by dissolving approximately 1 mg of the isolated HT polyethylene fraction into approximately 1 mL of TCB. The samples were dissolved in glass vials at 160° C. for 4 hours using the Pierce Reacti-Therm III heater/stirrer and were then filtered using glass wool stuffed pipettes in an aluminum block heated to 160° C.

The GPC columns and detectors were maintained at 160° C. The autosampler carousel hot zone was maintained at 160° C. while the warm zone was kept at 100° C. The instrument uses both a Viscotek 210R viscometer (Viscotek Corporation, Houston, Tex.) and a Polymer Labs refractive index detector (Polymer Laboratories, Amherst, Mass.). The injection loop was a 200 μL and the flow rate was 1.0 mL/min. The column set consisted of three Polymer Labs Mixed B 300×7.5 mm columns and one Polymer Labs Mixed B 50×7.5 mm column (Polymer Laboratories, Amherst, Mass.). The system was calibrated using a set of narrow molecular weight distribution polystyrenes ranging from 7.5 million to 7,000 g/mol (Polymer Laboratories, Amherst, Mass.). The GPC data collection and molecular weight calculations were performed using the TriSEC v3.0 software (Viscotek Corporation, Houston, Tex.). The molecular weight calculations were based on the Universal Calibration method as described by Benoit et al. in the Journal of Polymer Science, part B, volume 5, page 753, published in 1967. The results of GPC analysis are reported as number average molecular weight in g/mol.

EXAMPLES 1–3

In Examples 1–3, the polyethylene-filler compositions were prepared, as described herein, with each of the compositions containing 50 weight % SUPERCOAT calcium carbonate filler. The polyethylene of Example 1 was described herein as an ethylene-1-hexene interpolymer having a density of 0.916 g/cc, a melt index of 2.6 g/10 min, a weight % HT fraction of about 39.2%, and a Mn of the HT fraction about 45,000 g/mol. In Example 2, the polyethylene is an ethylene-octene-1 copolymer having a density of 0.917 g/cc, a melt index of 2.3 g/10 min, a weight % HT fraction of about 32.6%, and a Mn of the HT fraction of about 55,000 g/mol. The polyethylene of Example 3 was an ethylene-hexene-1 copolymer having a density of about 0.917 g/cc, a melt index of 2.3 g/10 min, a weight % HT fraction of about 30.9%, and a Mn of the HT fraction of about 55,000 g/mol. Each of the compositions of Examples 1–3 were extruded, as shown herein to produce blown films. Each of the films of Examples 1–3 were then stretched, as shown herein, by means of the interdigitation method, utilizing the earlier recited operating conditions. The stretched films of Examples 1–3 were then evaluated to determine the properties set forth in Table 1.

TABLE 1

Film Properties

| Example No. | 1 | 2 | 3 |
|---|---|---|---|
| Average MVTR, g/m²/day | 1049 | 541 | 437 |
| Dart Impact, g | 320 | 312 | 261 |
| Tensile Load at Yield | | | |
| MD, g | 670 | 625 | 665 |
| TD, g | 570 | 565 | 585 |
| Tensile Load at Break | | | |
| MD, g | 1170 | 1050 | 1048 |
| TD, g | 750 | 793 | 793 |

From the above data, it is observed that use of a polyethylene composition comprising a polyethylene having specified characteristics of the present invention, together with a filler, in specified proportions, results in the production of stretched film having improved properties, as compared with films formed from polyethylene compositions where the polyethylene component has properties outside the required range. A review of the data in Table 1 reveals that the film of Example 1 has significantly improved MVTR, as compared with the films of Examples 2 and 3. Moreover, other physical properties of the film of Example 1 are comparable with the physical properties of the films of Examples 2 and 3.

The invention has been described above in detail with particular reference to preferred embodiments thereof, but it will be understood that variations and modifications other than as specifically described herein can be effected within the spirit and scope of the invention. Moreover, all patents, patent applications, provisional patent applications, and literature references cited above are incorporated herein by reference for any disclosure pertinent to the practice of this invention.

We claim:

1. A composition comprising:
   (a) a polyethylene selected from the group consisting of a homopolymer of ethylene and an interpolymer of ethylene and at least one or more other olefin(s) having at least about 50% by weight of ethylene based upon the total monomers in the interpolymer, said polyethylene having a density of from about 0.91 to about 0.93 g/cc, a melt index of from about 1 to about 5 g/10 min, a weight percent high temperature fraction (% HT) as determined by TREF of about 25 to about 50 weight %, and a number average molecular weight (Mn) of the HT fraction collected during the TREF procedure of from about 35,000 to about 52,000 g/mol, and
   (b) a filler, present in an effective amount, such that a film formed from said composition has improved moisture vapor transmission rate.

2. The composition according to claim 1 wherein the polyethylene has a weight percent high temperature fraction (% HT) as determined by TREF of about 30 to about 45 weight %.

3. The composition according to claim 1 wherein the polyethylene is an interpolymer of ethylene and hexene.

4. The composition according to claim 1 wherein the polyethylene is an ethylene-hexene interpolymer having a density of about 0.916 g/cc, a melt index of about 2.6 g/10 min, a weight % high temperature fraction (% HT) as determined by TREF of about 39.2%, and a Mn of the HT fraction collected during the TREF procedure of about 45,000 g/mol.

5. The composition according to claim 1 wherein the filler is present in an amount of from about 20 to about 80 weight percent, based on the weight of the total composition.

6. The composition according to claim 1 wherein the filler is a calcium carbonate.

7. A film formed from the composition according to claim 1.

8. An article of manufacture comprising the composition according to claim 1.

* * * * *